United States Patent [19]
Cope et al.

[11] 3,811,043
[45] May 14, 1974

[54] MAP AND FLOOD LIGHT ASSEMBLY

[75] Inventors: Kenneth P. Cope; Warren Pearce, Jr., both of Warren, Ohio

[73] Assignee: General Motors Corporation, Detroit, Mich.

[22] Filed: Dec. 4, 1972

[21] Appl. No.: 312,208

[52] U.S. Cl. ............... 240/8.16, 240/2 S, 240/7.35
[51] Int. Cl. .............................................. B60q 3/04
[58] Field of Search ......... 240/7.35, 8.16, 8.14, 2 S, 240/645 R, 6.45 P, 5; 340/79, 80, 85

[56] References Cited
UNITED STATES PATENTS

| | | | |
|---|---|---|---|
| 3,515,863 | 6/1970 | Jungwirth | 240/7.35 |
| 1,693,596 | 12/1928 | Douglas | 240/8.16 |
| 3,553,448 | 1/1971 | Davis | 240/2 S |
| 3,609,341 | 9/1971 | Castaldo | 240/6.45 P |

*Primary Examiner*—Richard M. Sheer
*Assistant Examiner*—E. M. Bero
*Attorney, Agent, or Firm*—Peter D. Sachtjen

[57] ABSTRACT

A map and flood light assembly for the passenger compartment of a motor vehicle wherein a switching shutter is manually pivotable with respect to a combination lens and a light bulb between a flood light position exposing a tinted portion of the lens to the light bulb and a map light position exposing a clear portion of the lens to the light bulb. The switching shutter cams a contact arm to connect the light bulb to a variable voltage headlight circuit in the flood light position for illuminating control knobs, switches and other instrument panel components and in the map light position to connect the light bulb to a constant voltage courtesy light circuit for providing courtesy lamp illumination in the passenger compartment.

3 Claims, 8 Drawing Figures

PATENTED MAY 14 1974　　　　　　　　　　　3,811,043

MAP AND FLOOD LIGHT ASSEMBLY

The present invention relates to lamp assemblies and, in particular, to a combination map and flood light assembly for motor vehicles.

Direct illumination flood lamps are currently used in motor vehicles for illumination of switches, control knobs, and various legends on the instrument panel. The lamps are controlled by the headlight switch so that the illumination can be varied through the headlight switch rheostat. Generally, these lamps have a colored lens for providing a blue or green tinted illumination. A passenger controlled constant intensity map lamp is also generally provided for courtesy illumination in the passenger compartment. The courtesy lamp has a clear lens for providing white light illumination. Heretofore, these lighting functions were provided by separate lamp assemblies.

The present invention provides a single light assembly providing both the aforementioned map and flood map functions. This assembly provides a variable intensity tinted flood light for illumination of switches, control knobs and legends on the instrument panel and a clear map light for illumination of an interior sector of the passenger compartment. More particularly, the light source in this light assembly is connected in parallel with the headlight circuit and the courtesy light circuit. The light source is selectively switched between the circuits by a manually operated switching shutter. The shutter pivots with respect to a combination lens having a clear portion and a tinted portion. In the flood light mode, the shutter shades the clear portion of the lens and illumination is projected outwardly through the tinted portion of the lens. The light source is connected to the headlight switch so that the light intensity can be varied through the headlight switch rheostat. In the map light mode, the shutter is rotated to an open position and both portions of the lens are exposed to the light source, the latter being connected to the constant voltage courtesy light circuit. In this position, the aforementioned flood light function is provided through the tinted portion of the lens and the courtesy light function is provided through the clear portion of the lens. The switching is provided by a shutter actuated helical cam which shifts a flexible contact arm between two positions. In the first position, the arm makes contact with a terminal being fed from the courtesy light circuit. In the second position, the arm makes contact with a terminal being fed from the headlight circuit. A parallelogram stop block at the end of the shutter is held between two flexible arms and cooperates therewith to define stop surfaces corresponding to the aforementioned flood and map light positions.

Accordingly, an object of the present invention to provide a combination lamp assembly providing a constant and variable illumination as controlled by a shutter actuated switching mechanism.

Another object of the present invention is to provide a dual function lamp assembly wherein a light source serves to illuminate a select portion of a combination lens as controlled by a shutter actuated switch, the shutter being selectively interposed with respect to portions of the lens so as to control the sectors of illumination.

A further object of the present invention is to provide a dual function lamp assembly for a passenger compartment of a motor vehicle wherein a light source selectively connected to a constant voltage source or a variable voltage source is controlled by a shutter actuated switch, the shutter being interposed between the light source and a combination lens having a clear section and a tinted section, the clear section being shaded by the shutter from the light source when the latter is connected to the variable voltage source such that illumination is projected through the tinted section, the entire lens being exposed to the light source when the shutter is in a second position and the light source is connected to the constant voltage source such that a portion of the illumination is projected outwardly through the clear portion of the lens and the remaining portion projected through the tinted portion of the lens.

The above and other objects and features of the present invention will be apparent to one skilled in the art upon reading the following detailed description, reference being made to the accompanying drawings illustrating a preferred embodiment of the present invention in which.

Figure 1:
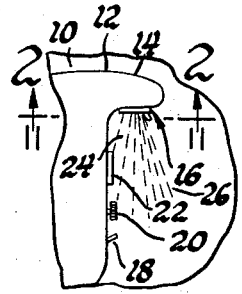
FIG. 1 is a schematic side view of a motor vehicle instrument panel incorporating a combination map and flood light assembly made in accordance with the invention showing the various sectors of illumination provided thereby.

Referring to FIG. 1, there is shown a passenger compartment 10 of a motor vehicle having an instrument panel 12 including a projecting horizontal ledge 14. A combination map and flood light assembly 16 made in accordance with the present invention serves to illuminate switches 18, control knobs 20, and dials 22 mounted on a vertical face of the instrument panel 12. The light assembly 16 provides a first sector of illumination 24 for lighting the aforementioned components 18, 20 and 22. The light assembly 16 provides a second sector of illumination 26 for general or courtesy lighting of the passenger compartment.

Figure 2:
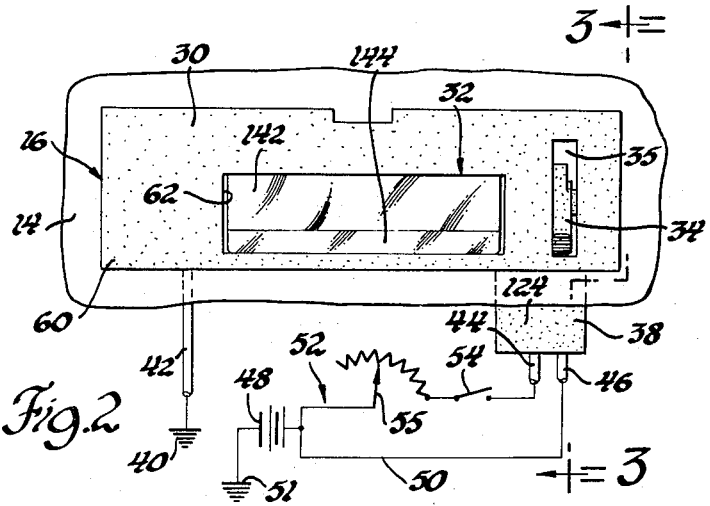
FIG. 2 is a view taken along line 2—2 of FIG. 1 showing the map and flood light assembly with respect to the instrument panel and schematically electrically connected to the courtesy light circuit and the headlight circuit.

Referring to FIG. 2, the light assembly 16 is mounted within a suitable mounting opening in the lower surface of the ledge 14. The light assembly 16 generally comprises a housing 30, a combination lens 32, a switching lever 34 projecting through a slot 35, a ground connector 36, and an input connector 38. The ground connector 36 is electrically connected to ground 40 by line 42.

The input connector 38 includes a pair of leads 44 and 46. The lead 44 is directly electrically connected to a voltage source 48 such as the vehicle battery by line 50. The voltage source 48 is connected to ground at 51. The line 50 may be part of the courtesy light circuit for the vehicle and provides a constant voltage at the lead 46. The line 44 is connected to the vehicle headlamp circuit 52. More particularly, the lead 44 is serially connected to a headlight switch 54 having a rheostat 55 and in turn to the voltage source 48. This arrangement provides for variable voltage to lead 44 in accordance with position of the rheostat 55 and on-off switching in accordance with the position of the switch 54.

Figure 4:
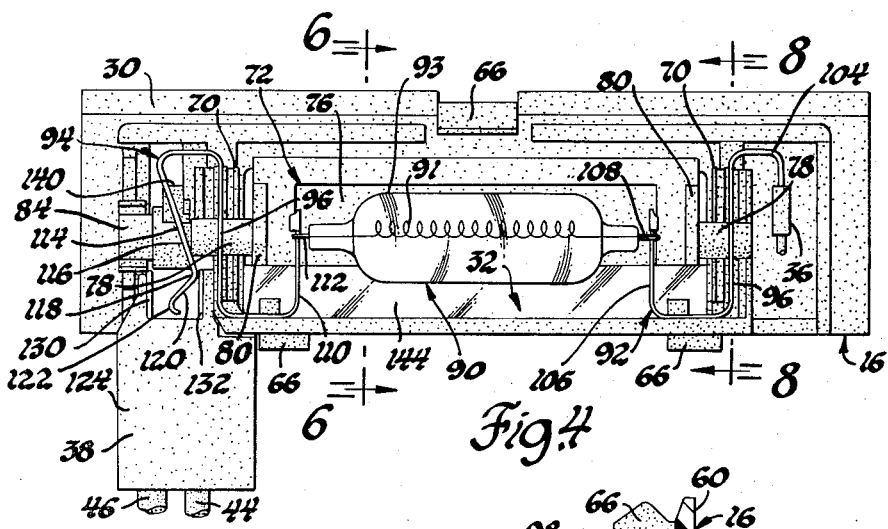
FIG. 4 is a view taken along line 4—4 of FIG. 3 showing a rear view of the subject lamp assembly with the shutter and switching mechanism in the flood light position.

The housing 30 comprises a unitary plastic molding and includes a front panel 60 having a rectangular opening 62. The lens 32 is attached to the rear surface of the panel 60 over the opening 62. As shown in FIG. 4, the periphery of the front panel 60 is provided with three flexible tabs 66. The upper tab deflects over the edge of the mounting opening to locate the housing 30 on the instrument panel 12. A pair of laterally spaced rearwardly projecting bearing blocks 70 are formed on the rear surface of the front panel 60 and are spaced at either end of the opening 62.

Figure 8:
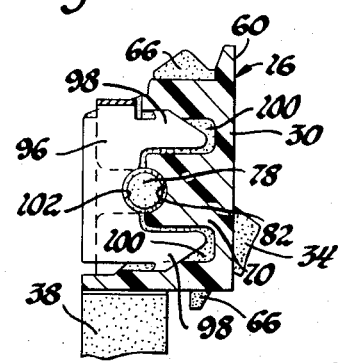
FIG. 8 is a view taken along line 8—8 of FIG. 4 showing the terminal retaining the shutter shaft on the housing.

A switching shutter 72 controlled by the lever arm 34 is mounted for pivotable movement about a transverse axis parallel to the lens 32. The shutter 72 includes a center arcuate shade 76 connected to a pair of end shafts 78 by connecting arms 80. As shown in FIG. 8, the shafts 78 are received in grooves 82 formed in the bearing blocks 70 and retained thereon as described below.

Figure 3:
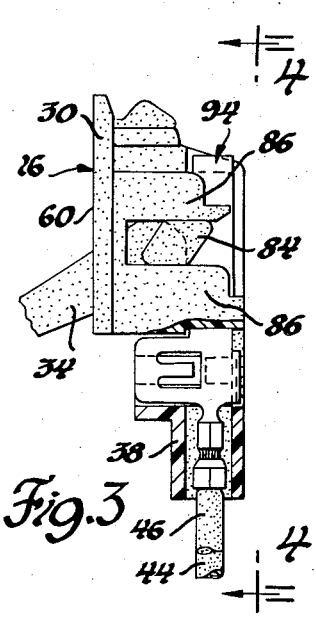
FIG. 3 is a view taken along line 3—3 of FIG. 2 showing the positive positioning of the shutter and switching mechanism.

The left end of the shaft 78 is formed with a parallelogram stop block 84 as shown in FIG. 4. As shown in FIG. 3, the stop block 84 includes opposed pairs of stop surfaces which alternately engage a pair of spaced flexible legs 86 at the end of the front panel 60. Upon rotation of the shutter 72, as controlled by the switching lever 34, the alternate sides of the stop block 84 engage the legs 86 to provide indexing of the shutter 72. The apexes of the sides pass over-center as accommodated by the flexing of the legs 86 to provide a self-centering positioning of the shutter 72.

An elongated light source 90 having a filament 91 axially disposed in an envelope 93 is supported with respect to the lens 22 and the shutter 72 by a grounding terminal 92 and an input terminal 94. As representatively shown in FIG. 8, each of the terminals includes a center body portion 96 having a pair of spaced barbed arms 98. The arms 98 are pressed into slots 100 formed in the bearing blocks 70 to fixedly secure the respective terminal on the housing 30. The center body portion 96 includes a grooved section 102 which embraces the shaft 78 and journals the shaft 78 on the block 70.

Referring to FIG. 4, the grounding terminal 92 includes a downwardly projecting outboard arm 104 which is adapted to be conventionally connected to the grounding connector 36. The grounding terminal 92 includes an upwardly projecting inboard arm 106 which is inserted through an eyelet loop 108 at the right end of the light bulb 90. This interconnection serves to position the right end of the light bulb 90 and electrically connect the right end of the filament 91 to ground.

Figure 5:
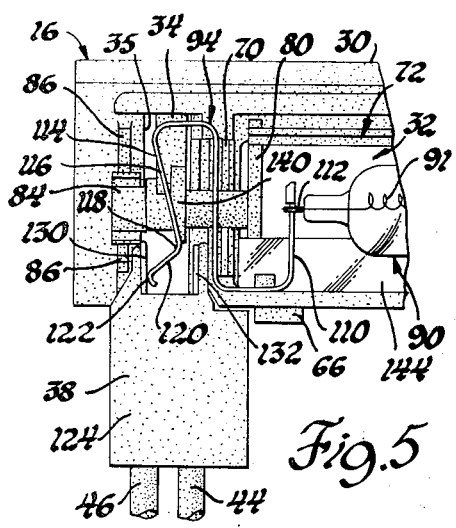
FIG. 5 is a fragmentary view similar to FIG. 4 showing the shutter and switching mechanism in the map light position.

As shown in FIG. 5, the inlet terminal 94 includes an upwardly extending inboard arm 110 which is inserted through an eyelet loop 112 at the left end of the light bulb 90. This interconnection serves to position the left end of the bulb 90 and electrically connect the left end of the filament 92 to the voltage source. In assembly the arms 110 and 106 are flexed to provide positive biasing on the loops 112 and 108 to resiliently fixedly mount the light bulb 90 on the housing 30. The outboard end of the grounding terminal 94 includes a flexible generally V-shaped contact arm 114. The contact arm 114 includes a center section 116, an apex 118, a lower section 120 and a rounded tip 122. The input connector 38 includes a plug section 124 received within a slot defined by the bearing blocks 70 and the arms 86. The input connector 38 includes a first contact 130 electrically connected to the lead 46 and a second contact 132 connected to the lead 44.

As shown in FIGS. 4 and 5, a helical cam 140 is formed on the left hand shaft 78 intermediate the stop block 84 and the shade 76. The cam 140 engages the center section 116. The contact arm 114 is normally biased to the right into engagement with the second contact 132. Upon rotation of the shutter 72, the helical cam 140 urges the contact arm to the left into engagement with the first contact 130.

When the tip 122 engages contacts 130, the light bulb 90 is electrically connected through lead 46 and line 50 to the voltage source 48 to provide a constant voltage to the filament 92. In the other position wherein the apex 126 engages the contact 132, the light bulb 90 is connected to the variable voltage headlight circuit 52.

The lens 32 is formed of a single plastic molding and includes a clear rectangular map light lens section 142 and a tinted rectangular flood light lens section 144. The map light lens section 142 may be tinted any appropriate color such as blue by a suitable process such as hot foil stamping. This longitudinally splits the lens 32 into two discrete lens sections for providing dual function lighting.

Figure 6:
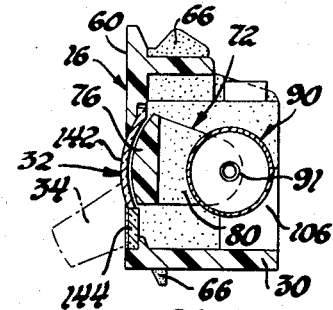
FIG. 6 is a view taken along line 6—6 of FIG. 4 showing the shutter in the flood light position.

With the lever 34 positioned as shown in FIGS. 3 and 6, the shade 76 of the shutter 72 is positioned between the map light lens section 142 and the light bulb 90 while leaving the tinted flood light lens section 144 exposed thereto. Referring back to FIG. 1, this will then direct illumination within the sector 24 to provide the flood lighting function to illuminate the dial 22, the control knob 20, and the switch 18 and, as above-described, provide a variable illumination in accordance with the position of the headlight switch rheostat 55.

Figure 7:
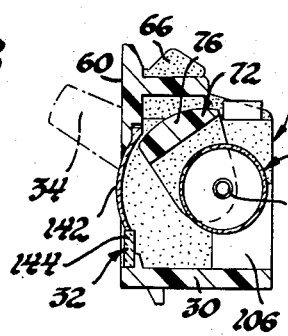
FIG. 7 is a view similar to FIG. 6 showing the shutter in the map light position.

When the switching lever 34 is rotated clockwise to the position shown in FIG. 7, the shade 76 assumes a position remote from the entire lens 22. Accordingly, illumination is projected directly outwardly through both the clear section 142 and the tinted section 144 for constant intensity illumination of sectors 24 and 26. The shutter 72 will be affirmatively indexed at both positions by the stop block 84 cooperating with the flexible arms 86.

The above-described light assembly thus provides a dual mode lighting for the interior passenger compartment of a motor vehicle. Through a single lens, a variable intensity flood light mode is provided for the instrument panel while a constant intensity clear illumination is provided for courtesy purposes to the passengers. Either mode is conveniently selectable by an occupant of the car and provides for independent illumination in accordance with the shutter setting.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A lamp assembly comprising:

a housing including a lens, said lens having a first portion and a second portion, a first terminal carried by the housing adapted to be connected to an electrical ground, a second terminal member carried by the housing, a light source electrically connected between said terminals, a shutter member carried by the housing, said shutter member being shiftable between a first position exposing one of said portions of said lens to the light source while shading the other of said portions from the light source and a second position exposing the other of said portions of said lens to the light source, a shiftable contact on said second terminal operatively connected to the shutter member, said contact being shifted between a first contact position and a second contact position as said shutter member is shifted between positions, said contact in said first contact positions being connected to a constant source of electrical power whereby constant illumination is provided through said first position of the lens and said contact in said second contact position being connected to a variable source of electrical power whereby variable illumination is provided through said second portion of the lens.

2. A light assembly for a motor vehicle having an electrical system including a constant electrical source and a variable electrical source, comprising: a housing having an opening therein; a lens on said housing covering said opening and having a first lens section and second lens section; a shutter having a shade adapted to substantially cover the first lens section; means rotatably supporting said shutter on said housing; actuating means operable to rotate said shutter; stop means operatively associated with said shutter for positioning the shade over the first lens section in a first position and for positioning the shade remote from said lens in a second position; first and second terminals on said housing, said first terminal adapted to be connected to an electrical ground; a light source electrically connected between said terminals; a flexible contact arm on said second terminal, said contact arm being biased by said shutter for movement between first and second contact positions as said shutter moves between said first position and said second position, said contact arm adapted to be electrically connected to said constant source of electrical power in said first position for providing constant intensity illumination through said first lens section, said contact arm adapted to be electrically connected to said variable source of electrical power in said second position for providing a variable intensity illumination through said second lens section.

3. In a motor vehicle having a constant voltage courtesy light circuit and a variable voltage headlight circuit, a map and flood light assembly for providing instrument panel illumination and passenger compartment illumination comprising: a plastic housing adapted to be carried on said instrument panel having a rectangular longitudinal opening therein; a longitudinally split lens on the rear surface of said housing covering said opening, said lens having a first map light lens section and a tinted flood light lens section; bearing grooves on said rear surface of said housing adjacent the ends of the opening; a shutter having a center shade adapted to substantially cover the map light lens section; shafts at the ends of the shade rotatably supported on said bearing grooves; a slot in the housing adjacent one of the shafts; an actuating member on said one of the shafts extending through the slot and operable to rotate the shutter; a stop member on the shutter having firs and second stop surfaces engageable with the housing, said first stop surface engaging the housing in a first position to locate said shade over said map light lens section, said second stop surface engaging the housing to locate said shade remote from the entire lens in a second position; a helical cam switch on one of the shafts; a first terminal on said housing at one end of the opening, said terminal overlying one of the shafts to rotatably journal the latter in one of the bearing grooves, said first terminal adapted to be connected to an electrical ground; a second terminal on said housing at the other end of the opening, said second terminal overlying the other of the shafts for rotatably journaling the latter in the other of the bearing grooves; a light source connected to said terminals and positioned remote from said shade and said lens; a flexible cantilevered contact arm on said second terminal, said contact arm operatively contacting said helical cam, said contact arm normally assuming a first contact position when the shutter is in said first position and being biased by said cam to a second contact position when the shutter is rotated to said second position, said contact arm adapted to be electrically connected to said courtesy light circuit in said first contact position for providing constant intensity passenger compartment illumination through the map light lens sections, said contact arm adapted to be electrically connected to said headlight circuit in said second contact position for providing a variable intensity instrument panel illumination through said flood light lens section.

\* \* \* \* \*

PO-1050
(5/69)

UNITED STATES PATENT OFFICE
CERTIFICATE OF CORRECTION

Patent No. __3,811,043__  Dated __May 14, 1974__

Inventor(s) __Kenneth P. Cope and Warren Pearce, Jr.__

It is certified that error appears in the above-identified patent and that said Letters Patent are hereby corrected as shown below:

Column 6, line 16, before "map" change "first" to -- clear --.

Signed and sealed this 15th day of April 1975.

(SEAL)
Attest:

RUTH C. MASON
Attesting Officer

C. MARSHALL DANN
Commissioner of Patents
and Trademarks